(12) United States Patent
Gibson et al.

(10) Patent No.: US 6,362,821 B1
(45) Date of Patent: Mar. 26, 2002

(54) SURFACE MODEL GENERATION FOR VISUALIZING THREE-DIMENSIONAL OBJECTS USING MULTIPLE ELASTIC SURFACE NETS

(75) Inventors: Sarah F. F. Gibson, Arlington; Michael E. Leventon, Cambridge, both of MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 09/225,454

(22) Filed: Jan. 6, 1999

(51) Int. Cl.[7] .............................................. G06T 17/00
(52) U.S. Cl. ...................... 345/424; 345/427; 345/441; 345/629; 382/131; 382/294
(58) Field of Search ................................. 345/424, 427, 345/428, 432, 433, 435, 441, 425, 589, 619, 629; 382/131, 154, 173, 294, 285

(56) References Cited

U.S. PATENT DOCUMENTS 5,633,951 A * 5/1997 Moshfeghi .................. 382/154
5,999,840 A * 12/1999 Grimson et al. ............ 600/424
6,023,495 A * 2/2000 Adler et al. .................... 378/4

OTHER PUBLICATIONS

Jones et al (Multi–dimensional morphable models: ISBN: 81–7319–221–9, IEEE, Jan. 1998).*

Antos et al ("Computer Aided Anatomy with the System Medicus": ITAB 97: ISBN:0–7803–4318–2).*

* cited by examiner

Primary Examiner—Mark Zimmerman
Assistant Examiner—Mano Padmanabhan
(74) Attorney, Agent, or Firm—Dirk Brinkman

(57) ABSTRACT

A method generates a surface model for a three-dimensional object. The object is scanned from a plurality of directions to produce a volume data for each scanning direction. Each volume data is segmented to extract data associated with the object. The volume data are then registered to a common coordinate frame. After registration, a surface net is initialized for each volume data. The multiple surface nets are relaxed and merge according to the common coordinate frame to generate a renderable surface model.

24 Claims, 5 Drawing Sheets

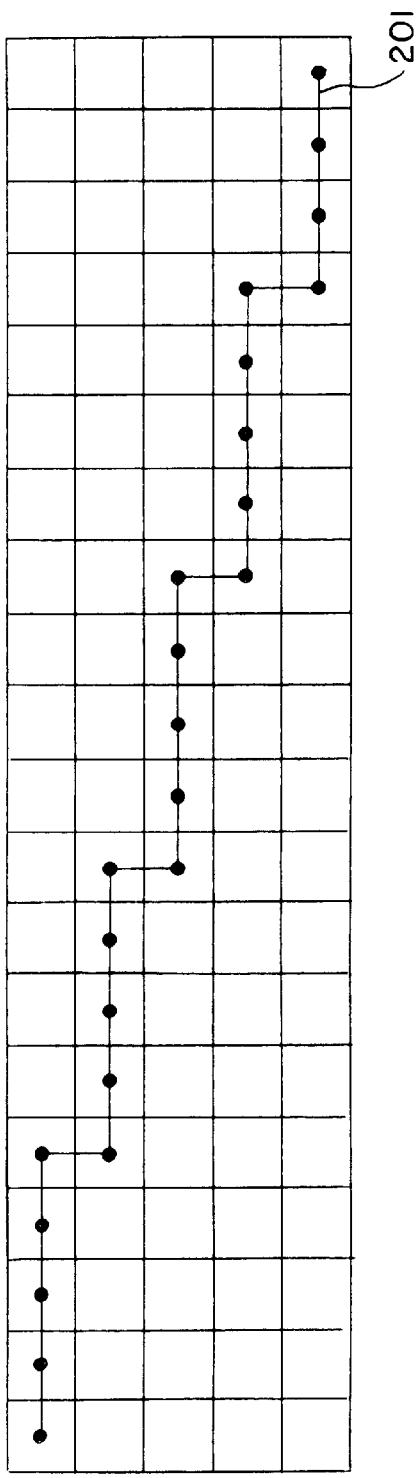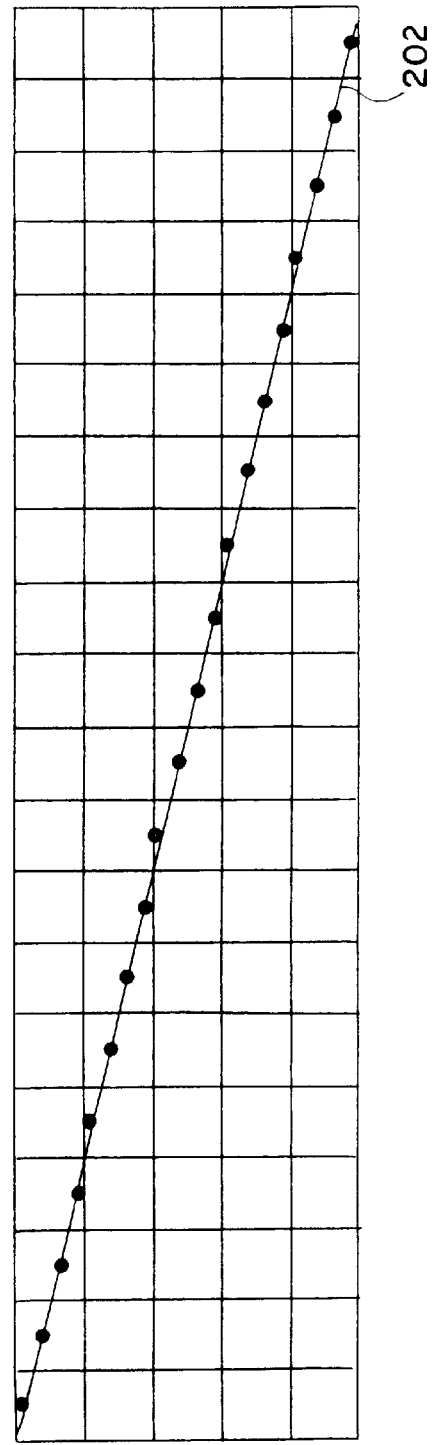
FIG. 2a
FIG. 2b

SURFACE MODEL GENERATION FOR VISUALIZING THREE-DIMENSIONAL OBJECTS USING MULTIPLE ELASTIC SURFACE NETS

FIELD OF THE INVENTION

This invention relates generally to graphic rendering, and more particularly to rendering surface models of three-dimensional objects.

BACKGROUND OF THE INVENTION

The generation of surface models of scanned three-dimensional objects is important for many applications. Anatomical structures scanned by medical imagery equipment aids clinical diagnosis, surgical simulation and planning, and image-guided surgery. A scan of an anatomical structure typically includes high-resolution data in the imaging plane and significantly lower resolution data between imaging slices. The lack of high-resolution information along the scanning direction causes aliasing, or terracing, artifacts in rendered surface models. These artifacts can distract or mislead the viewer. For surgical simulation, the terracing artifacts impede the realism of the visualization. For surgical simulation, the terraces produce the effect of very noticeable ridges when using haptic devices to sense the surface of the structure.

Terracing artifacts can be reduced by increasing the resolution of the scan. However, for CT scans, higher resolution between imaging planes exposes patients to a higher dose of radiation. For MR scans, longer scan times are necessary to achieve higher resolution. Long scan times increase cost and patient discomfort.

In clinical applications, scans are usually acquired in more than one direction. For example, instead of acquiring a single high resolution sagittal scan, lower resolution sagittal and axial scans may be acquired. Physicians use all scans for diagnosis, surgical guidance, and treatment.

In the prior art, two basic methods are commonly used to fit surfaces to binary data. In the first basic method, the binary data are low-pass filtered, and an algorithm, such as "marching cubes," is applied. There, the surface is built through each cube at an iso-surface of the gray-scale data, see Lorensen et al., "Marching cubes: a high resolution 3-D surface construction algorithm," Proc. SIGGRAPH 87, pp. 163–169, 1989. In order to remove terracing artifacts and to reduce the number of triangles in the triangulated surface, surface smoothing and decimation algorithms can be applied. However, because these procedures are applied to the surface without reference to the original segmentation, they can result in a loss of fine detail.

In the second basic method for fitting a surface to binary data, the binary object is enclosed by a parametric or spline surface. Control points on the spline surface are moved to converge with the binary data in order to minimize an energy function based on surface curvature and distance between the binary surface and the parametric surface. Such a method can be used to detect and track the surface of the left ventricle of the heart in sequences of MRI data, see McInerney et al., "Deformable models in medical image analysis: a survey," Medical Image Analysis 1(2), pp. 91–108, 1996.

A similar technique is used to generate a surface model of muscle from segmented data. Takanahi et al., "3-D active net for volume extraction," Proc. SPIE Electronic Imaging 1998, pp. 184–193, 1998. This approach has two main drawbacks for general applications. First, it is difficult to determine how many control points will be needed to ensure sufficient detail in the final model. Second, that method does not easily handle complex topologies.

Recently, a single constrained elastic surface net has been used to generate a surface model, see Gibson, "Constrained Elastic Surface nets: generating smooth surfaces from binary segmented data," MICCAI, 1998. There, an elastic surface net is fit to nodes placed on the surface of a binary segmented volume data. The nodes are moved so as to reduce the surface curvature of the net while constraining the net to remain within a distance of one voxel from the surface. This approach produces smooth surface models from binary segmented data that are faithful to the original segmentation.

However, terracing artifacts can still be a problem unless a very high resolution scan is used. Therefore, it is desired to generate a smooth surface representation from low-resolution scans.

SUMMARY OF THE INVENTION

The invention provides a method for generating a surface model for a three-dimensional object. The object can be any three dimensional physical structure or system that can be scanned, for example anatomical structures, turbine blades, machinery, and the like. The scanning can use any sensing modality such as medical imagery, radar, seismic waves, etc.

According to the invention, the object of interest is scanned from a plurality of scanning directions to produce a volume data for each scanning direction. The volume data is composed of voxels arranged as a three-dimensional data structure in a memory. Each voxel stores information related to the characteristics of the object at the corresponding location. As an advantage of the invention, the scans can be at a lower resolution than is normal for constructing 3D models.

Each volume data is segmented to extract or identify data associated with the object. The segmentation can be performed by labeling voxels of each volume. The volume data of each scan is then registered to a common coordinate frame by solving the six degrees of freedom pose of the object with respect to the various scanning directions.

After registration, a surface net is initialized for each volume data. The geometry of the initial surface net is determined by surface nodes located at the center of surface cells. A surface cell is the portion of the volume between eight neighboring voxels that straddle the surface of object.

The multiple surface nets are relaxed interdependently according to the common coordinate frame to generate a renderable surface model. The interdependent relaxation is done according to an iterative process that reduces the energy measured in links connecting the nodes. One example of an energy measure is the sum of the squared distances between neighboring surface nodes.

After the surface nets converge, to a predetermined criteria, one of the nets can be selected for rendering as a surface model that is true to the segmented volume data.

BRIEF DESCRIPTION OF THE DRAWINGS

FIGS. 2a and 2b are block diagrams of initialized and relaxed surface nets respectively;

DETAILED DESCRIPTION OF PREFERRED EMBODIMENTS

Introduction

We describe a method that combines data from multiple low-resolution orthogonal volume image scans to generate a surface model that has higher resolution than could be produced from any one scan alone.

Figure 1:
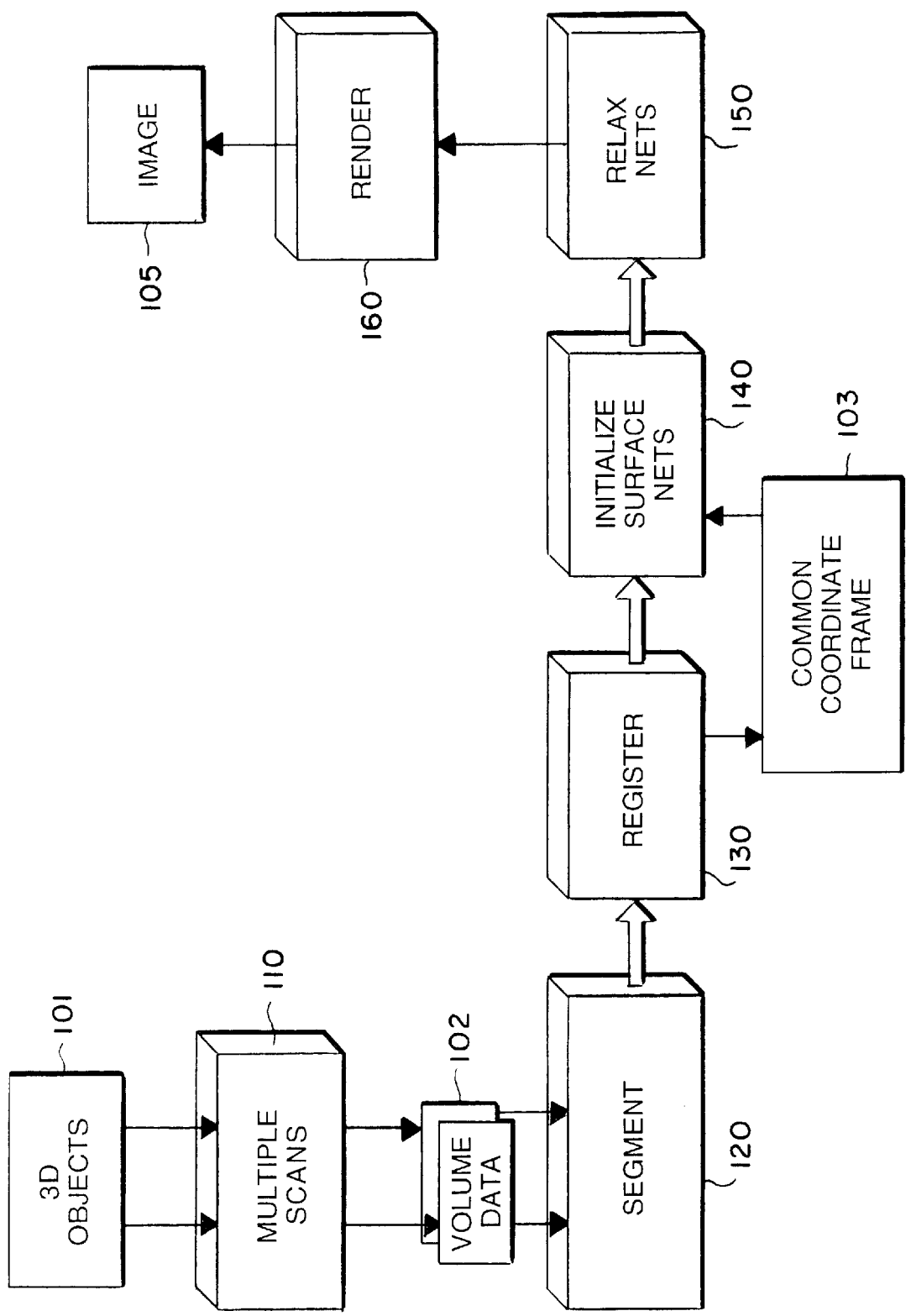
FIG. 1 is a flow diagram of a method for generating surface models according to the invention.

As shown in FIG. 1, the method according to our invention includes the following basic steps described in greater detail below. The object of interest 101 is first scanned (110) in multiple directions to produce multiple data volumes 102. For example, two orthogonal scans are taken. In a clinical application, these can be sagittal and axial scans of, for example, a knee joint. As an advantage of the invention, our method can use low-resolution scans. Each scanned volume data is composed of voxels, where each voxel is all information related to a portion of the object at specific coordinates. The information can describe, for example, various tissue densities.

In step 120, each volume data is segmented to extract the object of interest. Step 130 registers each volume data to a common coordinate frame 103. Step 140 initializes a surface net for each of the segmentations. Each surface net is composed of a network of linked surface nodes. Step 150 uses a dual iterative relaxation process to deform and merge the shapes of the surface nets, subject to constraints based on the resolution of the scans, to generate a smooth surface model that is true to each volume data. The surface model can then be rendered (160) as a two-dimensional image 105.

Segmentation

The structure of the object, e.g., a knee joint in an MR or a CT scan, is first extracted or segmented from each scan volume data before the volume data is used for surface model generation. Segmentation is the process of labeling voxels according to object attributes. For example, in an anatomical object, such as a knee joint, observed intensities can be used to identify different types of tissue.

The segmentation can be performed with automated techniques or semi-automated techniques. With CT scans, the segmentation of the volume data can be performed relatively automatically using intensity thresholding or other low-level image processing. Volume data generated by MRI scans may require a significant amount of human input in addition to sophisticated processing.

An example semi-automatic segmentation method uses real-time ray rendering where parameter values are interactively varied. The parameters of interest are the intensity thresholds used to define intensity-based tissue classifiers. When the slices are rendered, structural correction of the segmentation can be performed by interactively editing the 2D slices. Such editing may include highlighting regions of interest, and specifying labels for the contained voxels.

Registration

To combine the information from several volume data into a single model, all volume data must be registered to a single coordinate system. Registering rigid objects requires solving the six degree of freedom pose of the object in one scan with respect to the pose of the object in the other scans. Sophisticated methods exist to register the scans directly from the image data, see Wells et al., "Multi-Modal Volume Registration by Maximization of Mutual Information," Medical Image Analysis (1), pp. 35–51, 1996.

We prefer a straightforward registration process because binary segmentation is available. The best alignment of the volume data can be achieved by performing a stochastic gradient descent on the sum of squared differences of the smoothed segmented images. In practice, this straightforward registration method performs well on well-segmented binary image data.

Surface Net Initialization

Volume image scans typically include a sequence of "stacked" 2D image planes. The scans typically have a high resolution in the 2D image planes and a lower resolution between planes. An elastic surface net is built around the labeled voxels of each segmented volume data. If the volumes were generated by two orthogonal scans, then nodes in one net will have a high resolution in the 2D image plane, and low resolution in the third dimension, while the nodes in the other net have complimentary properties.

A surface net is initialized by locating "surface cells" that contain surface nodes. A surface cell is the portion of the volume surrounded by eight neighboring voxels in the binary segmented data, four voxels each from two adjacent planes. If all eight voxels have the same binary value, then the cell is either entirely inside or entirely outside of the object. If at least one of the voxels has a binary value that is different from its neighbors, then the cell is a surface cell. The net is initialized by placing a node at the center of each surface cell and linking nodes that lie in adjacent surface cells. Each node can have up to six links, one each to its right, left, top, bottom, front, and back neighboring nodes.

FIG. 2a shows a 2D surface net 201 in its initialized state, and FIG. 2b shows a relaxed net 202. The details of initializing a single surface net are described in U.S. patent application Ser. No. 09/079,079 "Surface net smoothing for surface representations from binary sampled data," filed by Gibson on May 14, 1998.

Interdependent Relaxation of a Single Surface Net

Once initialized, a surface net is "relaxed" to reduce terracing artifacts while remaining consistent with the input data. To relax a particular net, each node in the net is repositioned to reduce an energy measure in the links connecting the nodes. For example, a net can be relaxed iteratively by considering each node in sequence and moving that node towards a position equidistant between its linked neighboring nodes. The energy can be computed as the sum of the squared lengths of all of the links in the surface net. Alternative energy measures and relaxation schemes are also feasible. For example, a system that adjusts node positions to reduce local curvature can produce smoother surfaces.

Defining the energy and relaxation in this manner without any constraints would cause the surface net to shrink to a single point. Hence, to remain faithful to the original segmentation, a constraint is applied that keeps each node inside its original surface cell. This constraint favors the original segmentation over smoothness and forces the surface model to retain thin structures and cracks.

Dual Relaxation of Surface Nets

Figure 4:
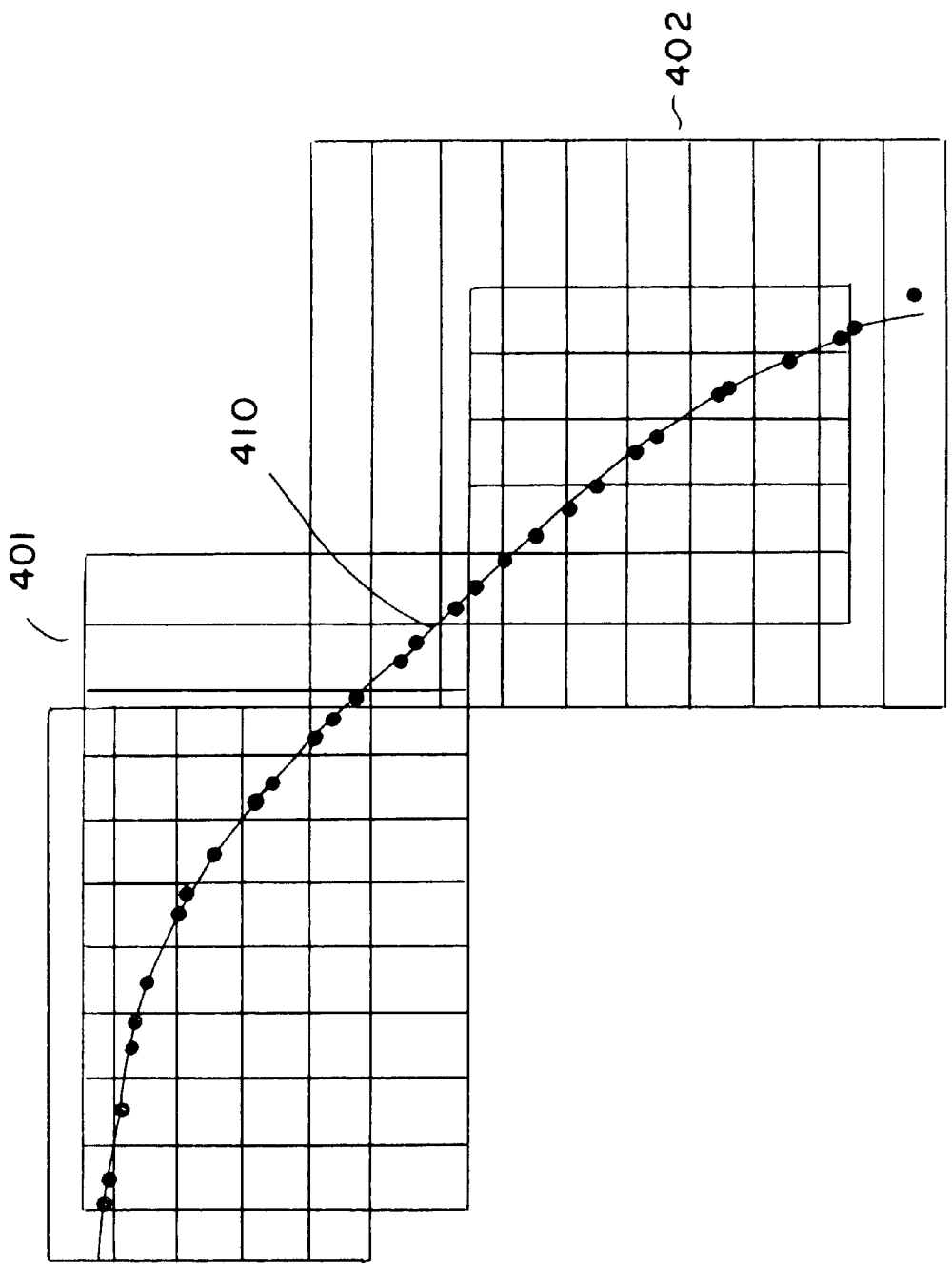
FIG. 4 is a block diagram of one surface model generated from multiple interdependent relaxed nets.

Relaxing a single surface net of an object significantly reduces the artifacts contained in the model. However, if the resolution in the scan is low in one direction, then there may not be enough information in one scan to fully "constrain the model and remove the terraces. We therefore use multiple scans, for example, two, as shown in FIG. 4. A first scan 401 has a higher resolution along the horizontal direction where the second scan 402 has a lower resolution horizontally but a higher resolution vertically. The two surface nets, once aligned in the same coordinate frame, are iteratively relaxed towards one another with the constraint that each node must remain within its surface cell to result in a smooth surface or relaxed net 410."

Figure 3:
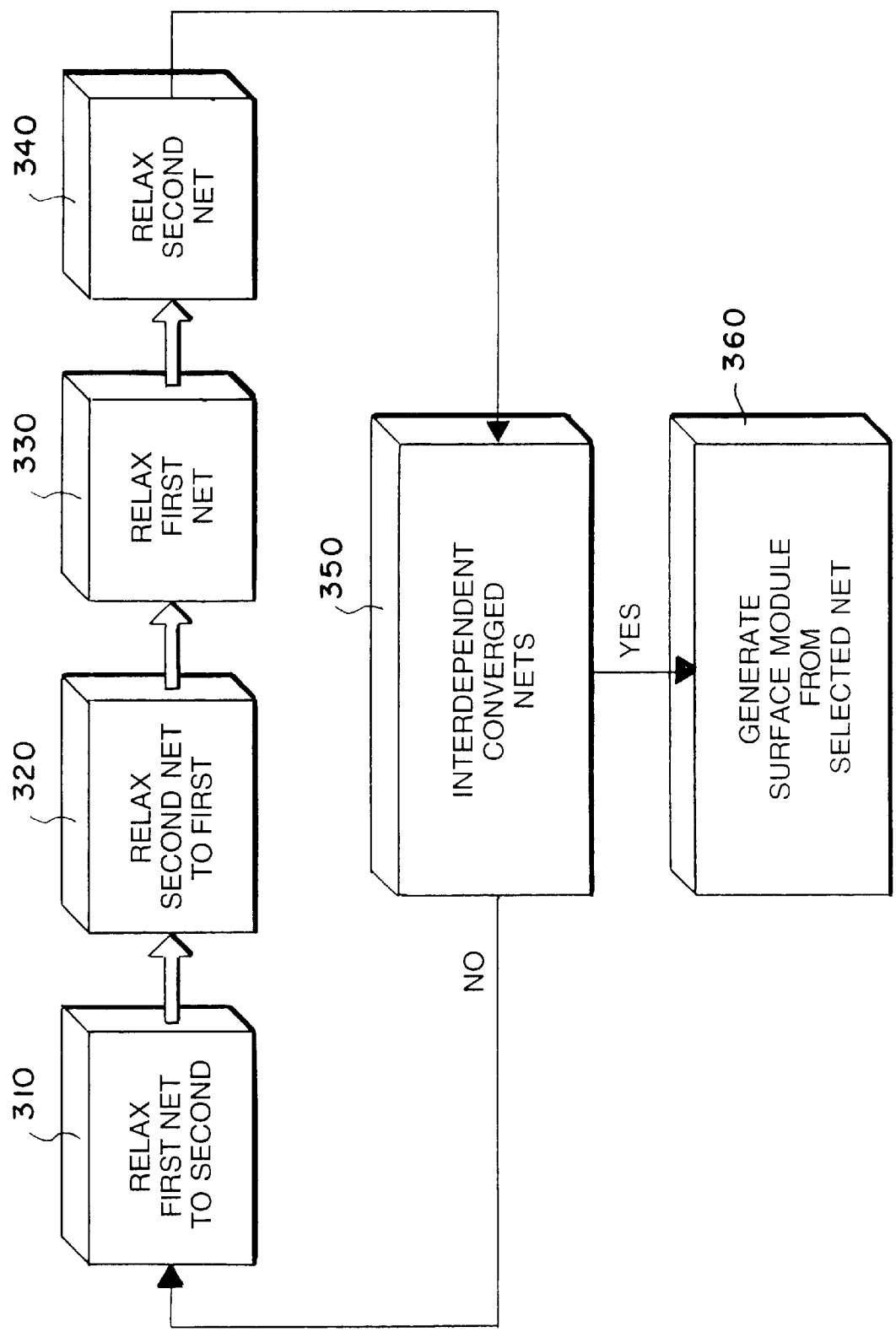
FIG. 3 is a flow diagram of the method steps of interdependent relaxing of multiple surface nets.

As shown in FIG. 3, a first relaxation step 310 moves each node n[i] a distance determined by taking an average (weighted by distance) of the corresponding node q[i] in the other net. Updating the node could violate its constraint by lying outside its cell c[i]. If the new position of the node is outside the cell, then the node is moved to a closest point on the cell boundary.

In the step 320, the second net is relaxed towards the first. After each full dual relaxation step, each net is relaxed individually in steps 330 and 340. The individual relaxations keeps the nets smooth as they converge.

The iterations progress until, for example, a predetermined number of nodes have merged as determined in step 350. Other termination thresholds can also be used, e.g., a fixed number of iterations. At this point, one of the nets can be selected (360) to represent the surface model. Alternatively, both nets can be rendered side-by-side, and the viewer makes the selection based on application and need.

In an ideal scanning, segmentation, and registration, the true surface of the object would always lie in the intersection of the surface cells of the two scans. In this ideal case, the two nets will converge on the identical surface with all surface cell constraints satisfied. In practice, the surface cells of two different scans are not likely to overlap perfectly due to imaging, segmentation, and registration errors.

For example, it could happen, after a small number of iterations, that a node that is pulled outside its constraining cell cannot meet a corresponding node in the other net. This signifies discrepancies between the two models. We therefore provide a means of relaxing the constraints to allow multiple nets to merge more closely.

In these instances, the constraining cell of every such node is dilated, while preserving the aspect ratio, by a small amount at the end of the iteration, allowing those nodes to move closer to the other net in the next iteration. Although the resultant net can move more than one voxel from the segmentations, the final surface model is guaranteed to be between the two initial models.

Figure 5:
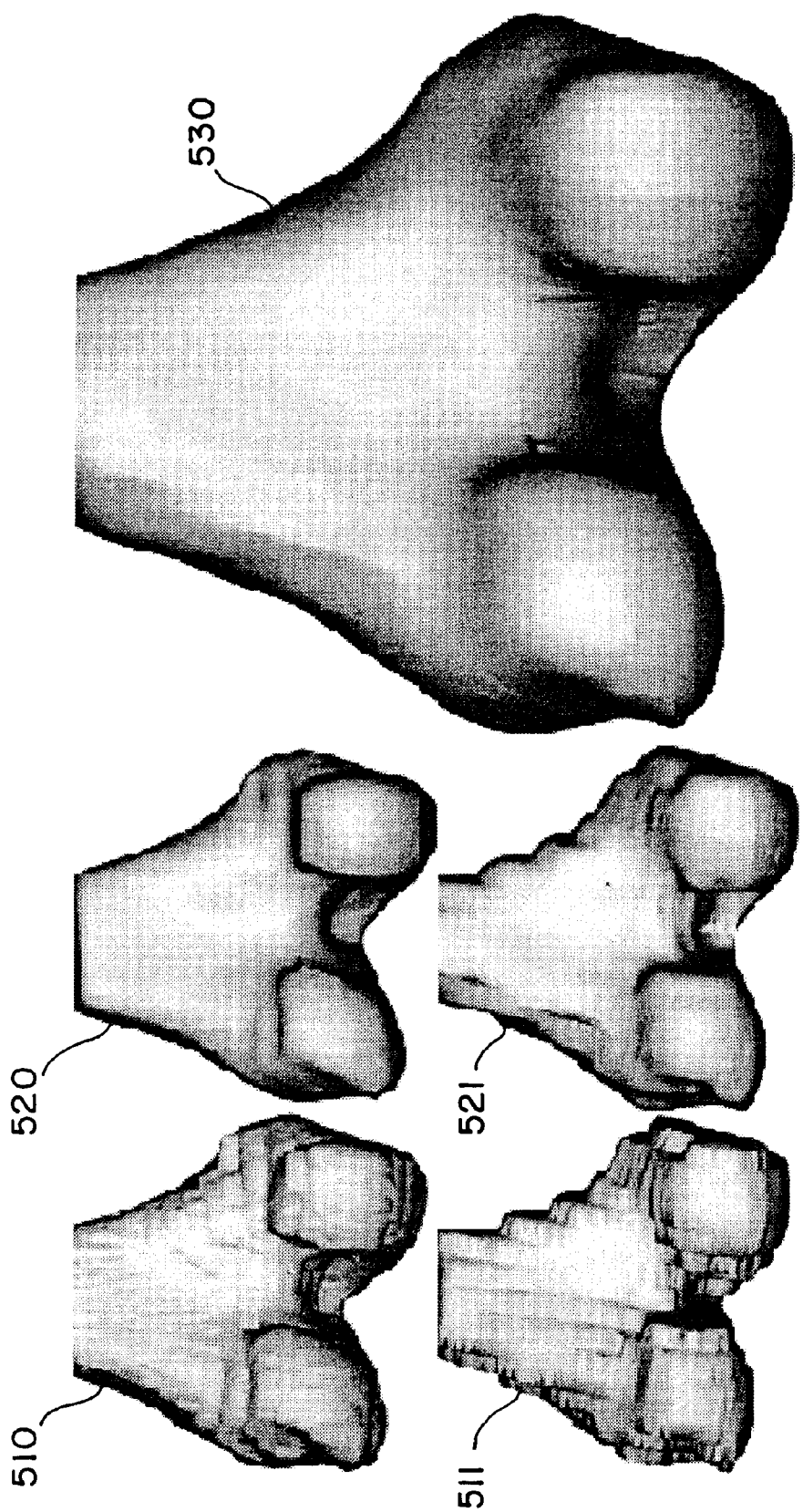
FIG. 5 compares surfaces models prepared by prior art techniques to one generated by the present invention.

FIG. 5 can be used to compare surface models used by various methods. Surface models 510 and 511 are of a knee joint as produced by marching cubes for axial and sagittal scans, respectively. Surface models 520 and 521 are produced from single surface nets in the axial and sagittal planes. Model 530 is generated from multiple (axial and sagittal) scans.

The present invention can also be used to generate surface models from range data obtained by a laser scanner. This technique may be used to plot the surface of a patient's skin. Using triangulation and striping, the scanner collects 3D data over two orthogonal directions. The number of samples collected in one direction can be less than in the other direction.

Although we have described a specific embodiment of our invention with respect to a medical application, it should be understood that our method can also be used in many other fields where physical objects are scanned. In addition, it should be realized, that more than two scanning directions can be used, and that the directions do not necessarily have to be orthogonal to each other.

It is to be understood that various other adaptations and modifications may be made within the spirit and scope of the invention. Therefore, it is the object of the appended claims to cover all such variations and modifications as come within the true spirit and scope of the invention.

We claim:

1. A method for generating a surface model of a three-dimensional object, comprising the steps of:

scanning the object from a plurality of directions to produce volume data for each scanning direction;

segmenting each volume data to identify data associated with the object;

registering each volume data to a common coordinate frame;

initializing a surface net for each volume data; and relaxing the surface nets interdependently according to the common coordinate frame to generate a renderable surface model.

2. The method of claim 1 wherein the object is scanned in two orthogonal directions.

3. The method of claim 1 wherein the scans are low-resolution scans.

4. The method of claim 1 wherein the segmentation identifies voxels of the volume data, the identified voxels corresponding to the scanned object.

5. The method of claim 1 wherein the segmenting is performed by intensity thresholding.

6. The method of claim 1 wherein the registering is performed by a stochastic gradient descent on the sum of squared differences of the smoothed segmented volume data.

7. The method of claim 1 wherein the surface nets are initialized by locating surface cells that contain surface nodes, a surface cell being defined by neighboring voxels straddling the surface of the object.

8. The method of claim 1 wherein the interdependent relaxing comprises the steps of:

relaxing a first surface net with respect to a second surface net;

relaxing the second surface net with respect to the first surface net;

relaxing the first surface net;

relaxing the second surface net; and repeating the relaxing steps until a predetermined threshold is reached.

9. The method of claim 7 wherein the surface cells are dilated to increase convergence of the surface nets.

10. A system for generating a surface model of a three-dimensional object, comprising:

means for scanning the object from a plurality of directions to produce a volume data for each scanning direction;

means for segmenting each volume data to identify data associated with the object;

means for registering each volume data to a common coordinate frame;

means for initializing a surface net for each volume data; and means for relaxing the surface nets interdependently according to the common coordinate frame to generate a renderable surface model.

11. A method for generating a surface model of a three-dimensional object, comprising:

identifying a first surface net based upon a first volume image scan of the object from a first direction, the first volume image scan having a first resolution;

identifying a second surface net based upon a second volume image scan of the object from a second direction different than the first direction, the second volume image scan having a second resolution; and relaxing the first and the second surface nets interdependently to generate at least one surface model having a third resolution higher than the first resolution and higher than the second resolution.

12. The method of claim 11, wherein the first direction is orthogonal to the second direction.

13. The method of claim 11, wherein the first resolution and the second resolution are the same.

14. The method of claim 11, wherein the first and the second surface nets each include a plurality of nodes, each node in one surface net corresponding to a respective node in the other surface net, further comprising:

mapping the first surface net and the second surface net to a common coordinate frame;

wherein the interdependent relaxing of the first and the second surface nets includes determining an average weighted distance between two corresponding nodes on the common coordinate frame, and moving the node belonging to the first surface net based upon the determined average weighted distance.

15. The method of claim 14, wherein the generated surface model is a smoothed surface model.

16. The method of claim 14, wherein:

each node is disposed within one of a plurality of cells, each cell having a boundary; and the interdependent relaxing of the first and the second surface nets includes moving the node no further than the cell boundary of the cell in which the moving node is disposed.

17. The method of claim 14, wherein:

each node is disposed within one of a plurality of cells, each cell having a boundary; and the interdependent relaxing of the first and the second surface nets includes dilating the cell in which the moving node is disposed in correspondence with the movement of that node based upon the determined average weighted distance.

18. A system for generating a surface model of a three-dimensional object, comprising:

a volume image scanning device configured to scan the object in a first resolution from a first direction and to scan the object in a second resolution from a second direction different than the first direction;

a processor configured to (1) receive from the volume image scanning device first volume image data associated with the scan in the first direction and second volume image data associated with the scan in the second direction, (2) identify a first surface net based upon the first volume image data and a second surface net based upon the second volume image data, and (3) relax the first and second surface nets interdependently to generate at least one surface model having a third resolution higher than the first resolution and higher than the second resolution.

19. The system of claim 18, wherein the first resolution and the second resolution are the same.

20. The system of claim 18, wherein the first direction is orthogonal to the second direction.

21. The system of claim 18, wherein:

the first and second surface nets each include a plurality of nodes, each node in one surface net corresponding to a respective node in the other surface net; and the processor is further configured to map the first surface net and the second surface net to a common coordinate system, and to, in interdependently relaxing the first and the second surface nets, determine an average weighted distance between two corresponding nodes on the common coordinate frame and move the node belonging to the first surface net based upon the determined average weighted distance.

22. The system of claim 21, wherein the generated surface model is a smoothed surface model.

23. The system of claim 21, wherein:

each node is disposed within one of a plurality of cells, each cell having a boundary; and the processor, in interdependently relaxing the first and the second surface nets, is further configured to move the node no further than the cell boundary of the cell in which the moving node is disposed.

24. The system of claim 21, wherein:

each node is disposed within one of a plurality of cells, each cell having a boundary; and the processor, in interdependently relaxing the first and the second surface nets, is further configured to dilate the cell in which the moving node is disposed in correspondence with the movement of that node based upon the determined average weighted distance.

* * * * *